United States Patent
Litwinowicz et al.

(10) Patent No.: US 9,139,290 B2
(45) Date of Patent: Sep. 22, 2015

(54) AIRCRAFT WEIGHT IDENTIFICATION USING FILTERED TRIM ESTIMATION

(71) Applicant: Sikorsky Aircraft Corporation, Stratford, CT (US)

(72) Inventors: Anthony Litwinowicz, Derby, CT (US); Stephen Kubik, Shelton, CT (US); Steven W. Hong, Honolulu, HI (US)

(73) Assignee: SIKORSKY AIRCRAFT CORPORATION, Stratford, CT (US)

( * ) Notice: Subject to any disclaimer, the term of this patent is extended or adjusted under 35 U.S.C. 154(b) by 78 days.

(21) Appl. No.: 14/022,623

(22) Filed: Sep. 10, 2013

(65) Prior Publication Data
US 2015/0073626 A1 Mar. 12, 2015

(51) Int. Cl.
*B64C 19/00* (2006.01)
(52) U.S. Cl.
CPC ...................................... *B64C 19/00* (2013.01)
(58) Field of Classification Search
USPC ............. 701/3–4, 14; 244/75.1; 340/945, 971
See application file for complete search history.

(56) References Cited

U.S. PATENT DOCUMENTS

| | | | |
|---|---|---|---|
| 4,220,993 A * | 9/1980 | Schloeman | 701/100 |
| 4,494,210 A | 1/1985 | Miller | |
| 4,574,360 A | 3/1986 | Bateman | |
| 5,229,956 A | 7/1993 | Daniell et al. | |
| 5,951,608 A * | 9/1999 | Osder | 701/11 |
| 5,987,397 A | 11/1999 | McCool et al. | |
| 7,296,006 B2 * | 11/2007 | Flynn et al. | 706/37 |
| 7,623,996 B1 | 11/2009 | Beyer | |
| 2008/0154442 A1 * | 6/2008 | Wipplinger et al. | 701/3 |
| 2009/0306839 A1 * | 12/2009 | Youngquist et al. | 701/14 |
| 2010/0250030 A1 * | 9/2010 | Nichols et al. | 701/7 |

* cited by examiner

*Primary Examiner* — Yonel Beaulieu
(74) *Attorney, Agent, or Firm* — Cantor Colburn LLP

(57) ABSTRACT

Embodiments are directed to receiving, by a computing device comprising a processor, at least one control input associated with an aircraft, obtaining, by the computing device, a predicted response to the at least one control input by filtering on a trim position, wherein the predicted response is based on a model of the aircraft, obtaining, by the computing device, an actual response of the aircraft to the at least one control input, comparing, by the computing device, the predicted response and the actual response, and determining, by the computing device, at least one attribute based on the comparison.

17 Claims, 4 Drawing Sheets

AIRCRAFT WEIGHT IDENTIFICATION USING FILTERED TRIM ESTIMATION

STATEMENT REGARDING FEDERALLY SPONSORED RESEARCH OR DEVELOPMENT

This invention was made with Government support under Agreement No. W911W6-10-2-0004 for Adaptive Vehicle Management System (AVMS). The Government has certain rights in this invention.

BACKGROUND

Gross weight and mass distribution are attributes that impact an aircraft's operation. For example, the attributes may impact the aircraft's stability, handling qualities, control authority, and operational maintenance. Acquiring mass attributes traditionally has been based on manual entry. Existing techniques for sensing aircraft attributes (e.g., mass) make use of data from a suite of sensors, such as cargo hook load cells and fuel level sensors to estimate values for the attributes. Such techniques are limited at least in terms of accuracy, such that additional reliability sensors must be added to measure unknown contributions. An invocation or utilization of the additional sensors include a number of drawbacks, such as increased complexity, increased weight of the aircraft, and decreased reliability of the overall aircraft as a result of another potential source of failure.

BRIEF SUMMARY

An embodiment of the disclosure is directed to a method comprising: receiving, by a computing device comprising a processor, at least one control input associated with an aircraft, obtaining, by the computing device, a predicted response to the at least one control input by filtering on a trim position, wherein the predicted response is based on a model of the aircraft, obtaining, by the computing device, an actual response of the aircraft to the at least one control input, comparing, by the computing device, the predicted response and the actual response, and determining, by the computing device, at least one attribute based on the comparison.

An embodiment of the disclosure is directed to an apparatus comprising: at least one processor, and memory having instructions stored thereon that, when executed by the at least one processor, cause the apparatus to: receive at least one control input associated with an aircraft, obtain a predicted response to the at least one control input by filtering on a trim position, wherein the predicted response is based on a model of the aircraft, obtain an actual response of the aircraft to the at least one control input, compare the predicted response and the actual response, and determine at least one attribute based on the comparison.

An embodiment of the disclosure is directed to an aircraft comprising: an adaptive vehicle management system configured to: receive at least one control input associated with the aircraft, obtain a predicted response to the at least one control input by filtering on a trim position, wherein the predicted response is based on a model of the aircraft, obtain an actual response of the aircraft to the at least one control input, compare the predicted response and the actual response, and determine at least one attribute based on the comparison.

Additional embodiments are described below.

BRIEF DESCRIPTION OF THE DRAWINGS

The present disclosure is illustrated by way of example and not limited in the accompanying figures in which like reference numerals indicate similar elements.

DETAILED DESCRIPTION

Figure 1:
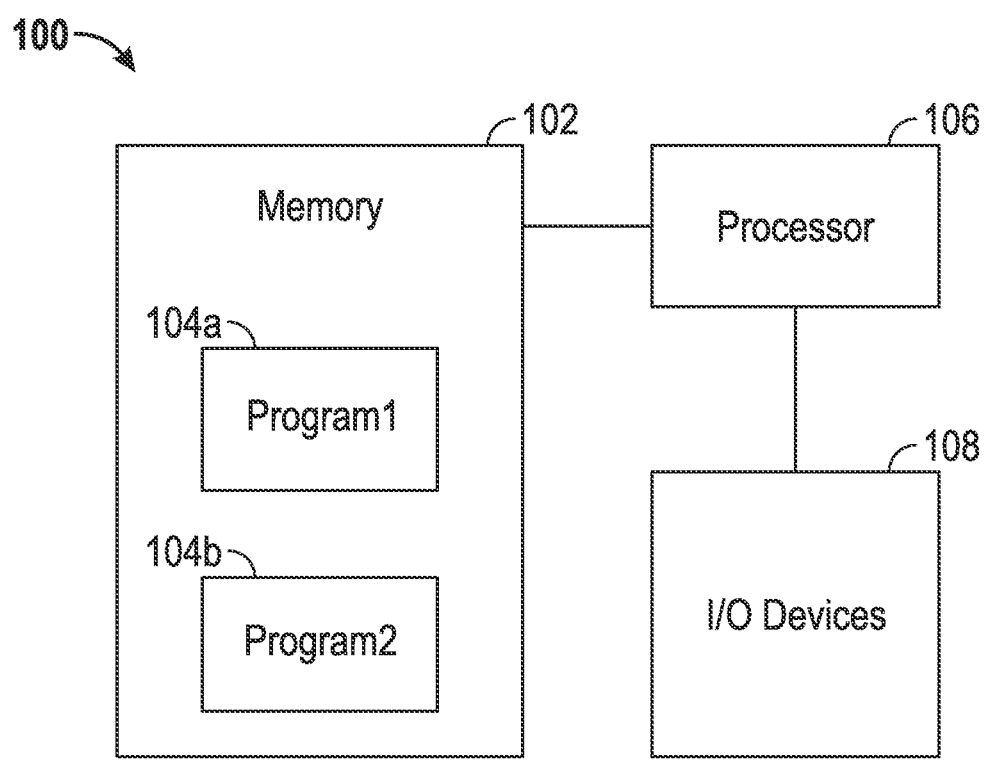
FIG. 1 is a schematic block diagram illustrating an exemplary computing system in accordance with one or more embodiments of this disclosure.

It is noted that various connections are set forth between elements in the following description and in the drawings (the contents of which are included in this disclosure by way of reference). It is noted that these connections in general and, unless specified otherwise, may be direct or indirect and that this specification is not intended to be limiting in this respect. In this respect, a coupling between entities may refer to either a direct or an indirect connection.

Exemplary embodiments of apparatuses, systems, and methods are described for determining attributes associated with an aircraft. In some embodiments, the attributes may include a weight (e.g., a gross weight) of the aircraft and a distribution of mass about the aircraft. In some embodiments, a filtering algorithm may be applied to correlate a predicted aircraft response to one or more inputs to an actual response by the aircraft to the one or more inputs. Statistical data may be used to enhance the accuracy of a model associated with the aircraft.

Referring to FIG. 1, an exemplary computing system 100 is shown. The system 100 is shown as including a memory 102. The memory 102 may store executable instructions. The executable instructions may be stored or organized in any manner and at any level of abstraction, such as in connection with one or more processes, routines, methods, etc. As an example, at least a portion of the instructions are shown in FIG. 1 as being associated with a first program 104a and a second program 104b.

The instructions stored in the memory 102 may be executed by one or more processors, such as a processor 106. The processor 106 may be coupled to one or more input/output (I/O) devices 108. In some embodiments, the I/O device(s) 108 may include one or more of a keyboard or keypad, a touchscreen or touch panel, a display device, a microphone, a speaker, a mouse, a button, a remote control, a joystick, a printer, etc. The I/O device(s) 108 may be configured to provide an interface to allow a user to interact with the system 100.

The system 100 is illustrative. In some embodiments, one or more of the entities may be optional. In some embodiments, additional entities not shown may be included. For example, in some embodiments the system 100 may be associated with one or more networks. In some embodiments, the entities may be arranged or organized in a manner different from what is shown in FIG. 1. One or more of the entities shown in FIG. 1 may be associated with one or more of the devices or entities described herein.

Figure 2:
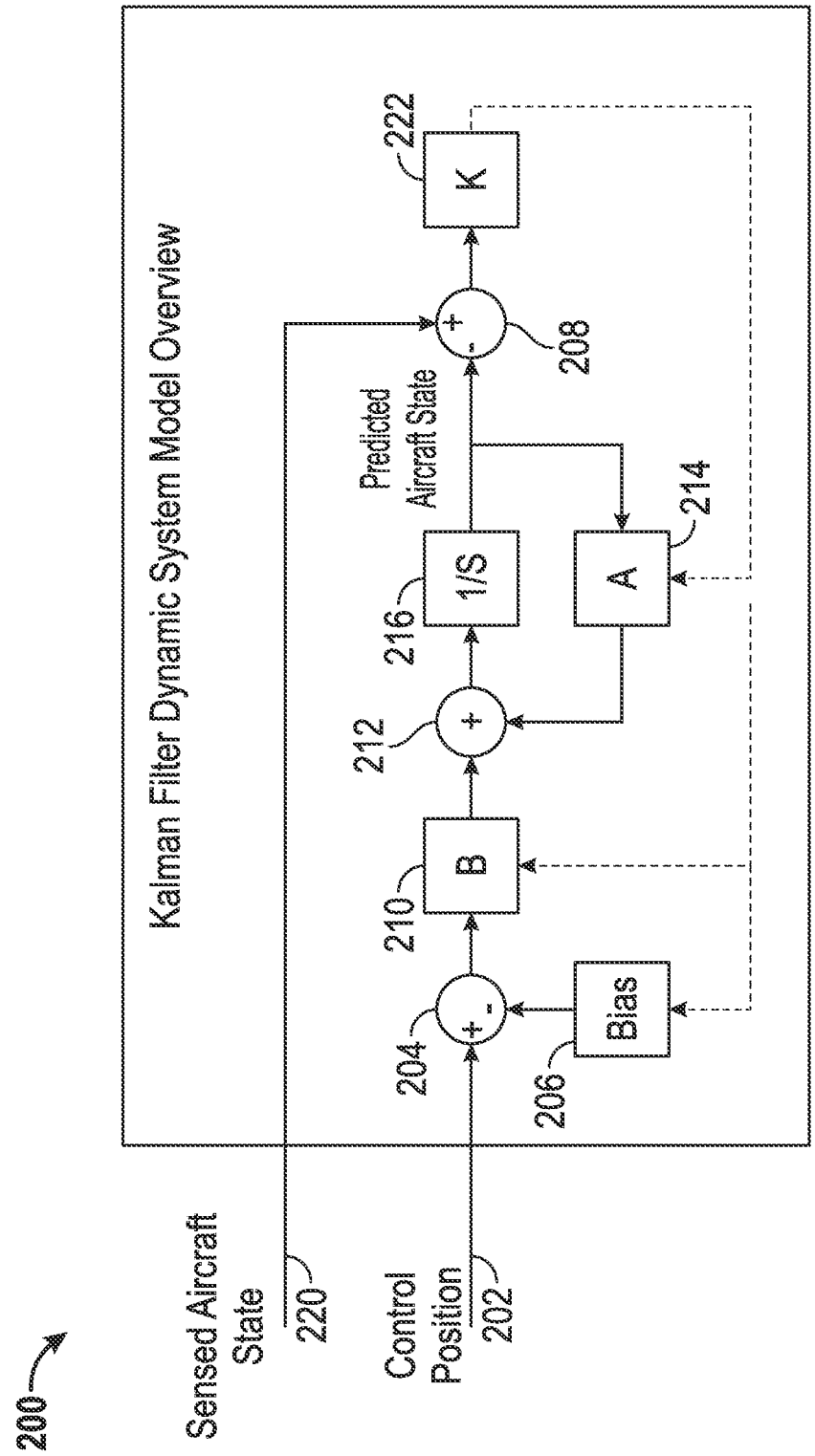
FIG. 2 illustrates a block diagram of a filter in accordance with one or more embodiments of this disclosure.

Turning to FIG. 2, a filter 200 is shown. In some embodiments, the filter 200 may be implemented as hardware, software, firmware, or any combination of hardware, software, and firmware. For example, filter 200 may be implemented by processor 106. The filter 200 may be implemented as part of an aircraft or aircraft system, such as a helicopter. The filter 200 may be used to identify changes in properties or attributes associated with an aircraft, such as changes in the aircraft's weight or distribution of mass. In some embodiments, the filter 200 may correspond to, or include, a Kalman filter.

In some embodiments, the filter 200 may be implemented as a first-order filter with respect to a particular axis. For example, with respect to an aircraft, the filter 200 may be implemented with respect to one of the pitch axis, the roll axis, or the yaw axis. Multiple instances of the filter 200 may be used, such that a particular instance of the filter 200 may be used for a particular axis. In some embodiments, the filter 200 may be generalized to facilitate higher-orders of use or a greater number of axes.

As shown in FIG. 2, the filter 200 may receive a control input, such as a control position 202. The control position 202 may correspond to an identification of the state of one or more controls. For example, the control position 202 may identify a swashplate position or rotor blade angles in a helicopter application of the filter 200. In some embodiments, the control position 202 may be based on a sensed parameter that relates to a control surface deflection. In some instances, a direct sensing of a control surface may be costly or infeasible. In those instances, a control surface relationship may be derived.

The control position 202 may be combined at combination element 204 with a bias 206. The bias 206 may correspond to a trim (collective) position. The trim position may correspond to the control position(s) or control inputs that satisfy a particular aircraft position or condition. For example, the trim position may correspond to control inputs that provide or generate a condition of a zero-valued output, where the zero-valued output may correspond to the output of a combination element 208.

The combination element 204 may combine the control position 202 and the bias 206. For example, the combination element 204 may subtract the bias 206 from the control position 202.

The output of the combination element 204 may serve as an input to a model 210. In some embodiments, model 210 may correspond to an aircraft's response (e.g., a model of an aircraft's response) with respect to the control position 202.

The output of model 210 may be combined at combination element 212 with the output from a model 214. The combination element 212 may add the output of model 210 with the output of model 214. Model 214 may receive an output from integrator (1/S) 216 to formulate or model a lag in a response of an aircraft to a control input. For example, model 214 may correspond to a specification of a change in a rate due to a rate that the aircraft already has. Model 214 may effectively specify how quick or slow the lag is.

Model 210 and model 214 may be implemented as matrices or variables, and may be used to take into account dynamics of a system (e.g., an aircraft) associated with the filter 200.

The output of the integrator (1/S) 216 may correspond to a predicted state 218 for, e.g., an aircraft. The predicted state 218 may be combined at combination element 208 with a sensed or actual state 220 for, e.g., the aircraft. The combination element 208 may subtract the predicted state 218 from the sensed state 220, and the difference may be provided to a correction factor 222. The correction factor 222 may be used to adjust one or more of the bias 206, model 210, or model 214, with a goal of having the predicted state 218 match, or converge to, the sensed state 220. Such convergence may take place over time.

As described above, the filter 200 may correlate a predicted response (e.g., predicted state 218) to an actual dynamic response (e.g., sensed state 220) by adjusting an equivalent model (e.g., the filter 200). The usage of statistics may enable a "most likely" or "best" fit to the dynamics. In some embodiments, a confidence score or level may be used or provided to indicate a likelihood or probability that the fit matches the actual dynamic response. The model may identify a trim location or trim position by estimating a steady state control input that might not induce a dynamic response.

The trim location may have a relationship with one or more axes. For example, in connection with an aircraft, the trim location may have a direct relationship to center of gravity in the pitch and roll axes and gross weight in the vertical axis and thus can be used to determine these attributes. When the aircraft is engaged in flight, the model may identify changes in one or more attributes (e.g., mass) in real-time, or substantially in real-time, and may evaluate itself against truth or reality.

Figure 3:
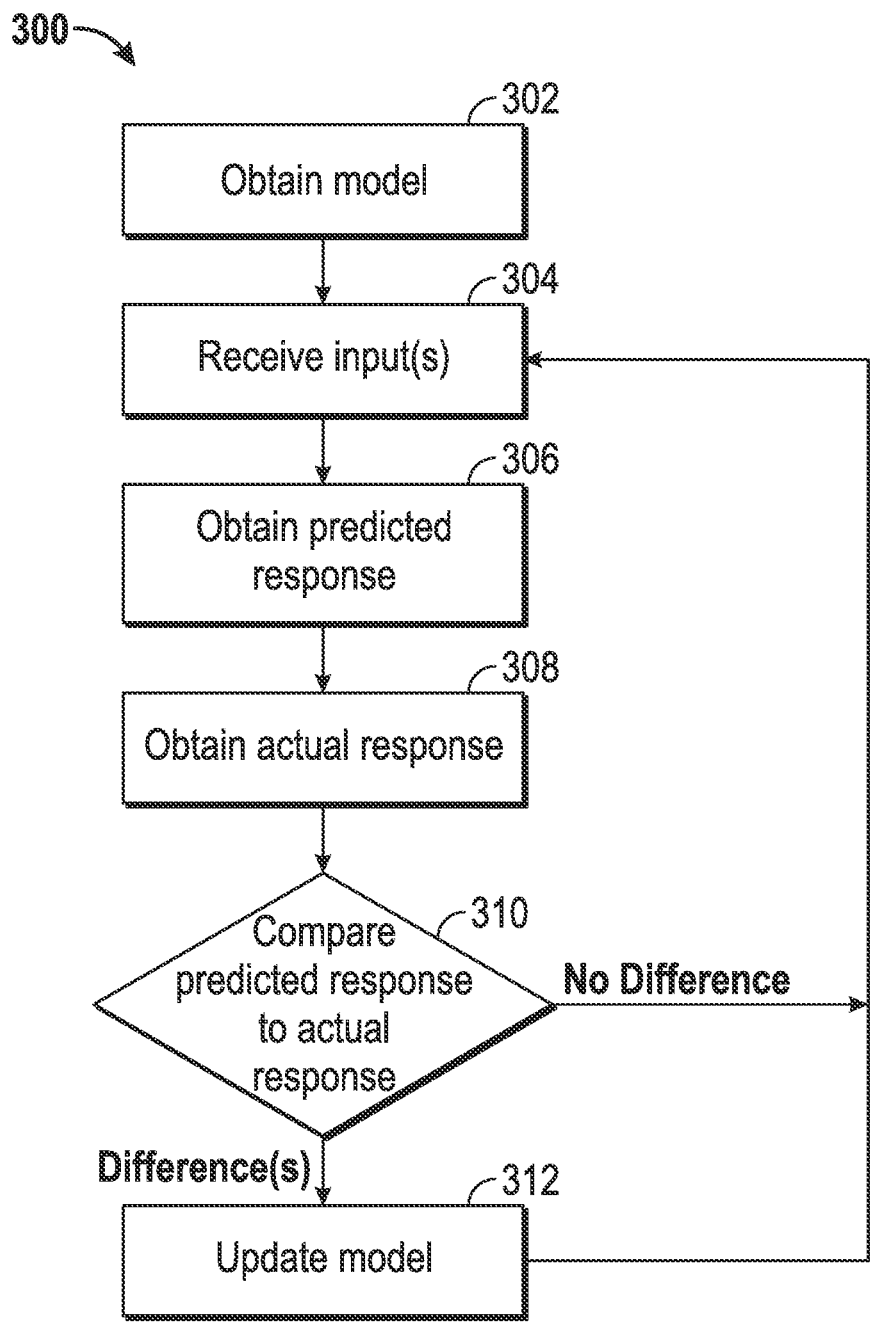
FIG. 3 is a flow chart of an exemplary method in accordance with one or more embodiments of this disclosure.

Turning to FIG. 3, a flow chart of a method 300 is shown. The method 300 may be executed in connection with one or more components, devices, or systems, such as those described herein. The method may be used to identify changes in one or more attributes associated with, e.g., an aircraft.

In block 302, a model of an aircraft and/or the aircraft's attributes may be obtained or received. In some embodiments, the model may be based on engineering assumptions or manual entry when a model is not initially available, such as based on an initial build or deployment of the aircraft. When the model is already available, it may be obtained from a storage or memory (e.g., memory 102 of FIG. 1).

In block 304, one or more inputs may be received. An input may be received from one or more sensors. The input(s) may include one or more control inputs. An input may be received periodically or in accordance with a schedule. An input may be received in response to a command for the data. For example, a controller or aircraft computer may request data from a sensor, and the data may be returned to the controller or aircraft computer in response to the request. In some embodiments, a sensor may provide the data without the use of a request or command. For example, a sensor may provide the data as soon as it becomes available or sometime thereafter.

In block 306, a prediction of the aircraft's response to the input(s) of block 304 may be obtained. For example, knowledge (e.g., statistical knowledge) of the aircraft's response to one or more inputs (e.g., control inputs) may be utilized to generate a prediction of the aircraft's response to the input(s) of block 304. The predicted response 306 may also include a confidence value or some other indication of the likelihood or probability of the predicted response being accurate.

In block 308, the aircraft's actual response to the input(s) of block 304 may be obtained. The actual response may be based on output provided by one or more sensors.

In block 310, the predicted response (block 306) and the actual response (block 308) may be compared for any differences. The comparison of block 310 may be used to identify a trim location, and may be used to identify or determine changes in one or more attributes (e.g., mass) associated with the aircraft.

If there are differences detected as part of block 310, then flow may proceed from block 310 to block 312. The model may be updated in block 312 (and potentially stored in, e.g., memory) to facilitate future executions or iterations of the method 300. In this respect, flow may proceed from block 312 to block 304 to continue to receive input(s). On the second and subsequent iterations of the method 300, the predicted response 306 may be based on the updated model associated with block 312.

If there are no differences detected, then the model might not need to be updated, and flow may proceed from block 310 to block 304.

In some embodiments, even when no difference is detected in block 310, flow may still proceed from block 310 to block 312. For example, such a flow may be used to log or record the data or input(s) of block 304, the predicted response of block 306, and the actual response 308, as part of the operation of block 312. Such a recording may be used to facilitate generating a confidence value in connection with block 306 during subsequent executions/iterations of the method 300.

In some embodiments, one or more of the blocks or operations (or a portion thereof) of the method 300 may be optional. In some embodiments, the blocks may execute in an order or sequence different from what is shown in FIG. 3. In some embodiments, one or more additional blocks or operations not shown may be included. For example, in some embodiments, one or more values for inputs, one or more responses, and/or one or more results may be presented on an I/O device (e.g., a display screen).

Figure 4:
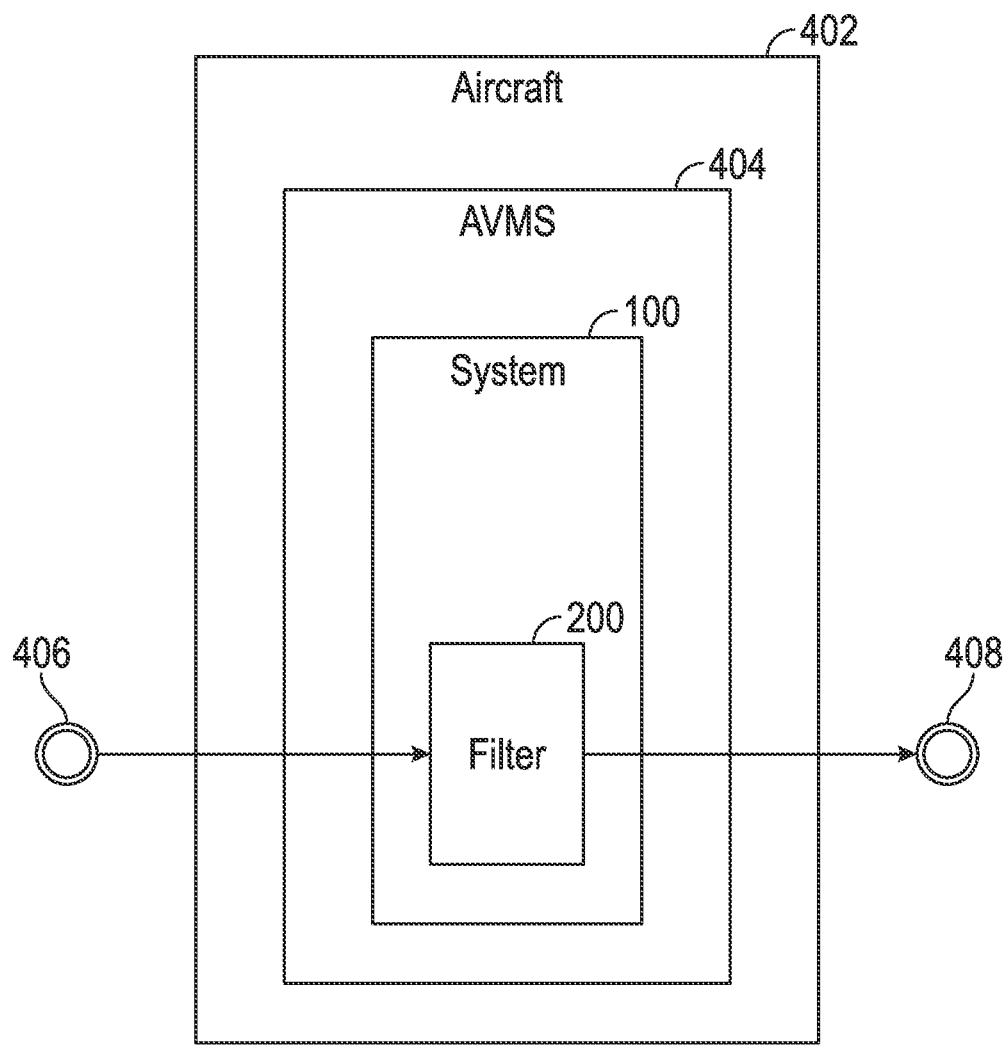
FIG. 4 is a block diagram of an aircraft implementing an Adaptive Vehicle Management System (AVMS) in accordance with one or more embodiments of this disclosure.

FIG. 4 illustrates an exemplary block diagram associated with an aircraft 402. As shown in FIG. 4, the aircraft may include an Adaptive Vehicle Management System (AVMS) 404. The AVMS 404 may be located in one or more portions, areas, or regions of the aircraft 402.

The AVMS 404 may be configured to measure, determine, or generate one or more attributes, such as those described herein. In some embodiments, the AVMS 404 may include one or more components or devices of the system 100 of FIG. 1. In some embodiments, the AVMS 404 and/or the system 100 may include or implement the filter 200 of FIG. 2. As shown in FIG. 4, a node 406 may be representative of one or more inputs (e.g., control position 202 of FIG. 2). The one or more inputs 406 may originate at the aircraft 402, be associated with an environment condition in which the aircraft operates, etc. The one or more inputs 406 may be processed by the AVMS 404 (e.g., by the system 100 and/or the filter 200) to generate one or more outputs represented by the node 408. The one or more outputs 408 may include one or more of a predicated aircraft state (e.g., predicted aircraft state 218 of FIG. 2), a model of the aircraft (e.g., model 302 or 312 of FIG. 3), one or more attributes, etc. The one or more outputs 408 may be provided to an entity located on the aircraft 402 or to another entity.

Embodiments of this disclosure may be tied to one or more particular machines. For example, one or more computers, devices, or architectures may be configured to compute or determine values for attributes associated with an aircraft. In some embodiments, a device may be configured to maintain a model of an aircraft, and the model may include the attributes. The model may be updated over time based on the aircraft's response to one or more inputs, such as one or more control inputs.

Embodiments may be used to enhance the accuracy of an aircraft model. For example, existing technologies that seek to: (a) sense enough of an aircraft's components/devices that vary in weight, and/or (b) rely on manual entry for difficult-to-obtain quantities may do so in a manner that is unable to determine when estimated values for the attributes are grossly dissimilar from the actual values for the attributes.

Embodiments may be used to address flight criticality requirements and eliminate or reduce human error. Embodiments of the disclosure may be implemented without requiring additional sensors.

Embodiments may be used to adjust the attributes. Such adjustment may be used to enhance or optimize performance of the aircraft. In some embodiments, laws (e.g., fly-by-wire control laws) may be scheduled with respect to the attributes, potentially dynamically adjusting a control response. As such, aircraft stability and handling qualities may be improved, particularly at the edges of the aircraft's operational envelope. Accordingly, engineers might no longer need to sacrifice performance at the edge(s) of the operational envelope due to a lack of reliable or accurate information/data because such information/data may now be available.

Embodiments of the disclosure may be used to present information or data to a user, such as a pilot of an aircraft. Such information/data may include attributes (e.g., weight, mass) associated with the aircraft. Presentation of the information/data may be used to increase user awareness of the attributes. Furthermore, the information/data may be used to improve knowledge of aircraft fatigue, which in turn may reduce premature retirement of aircraft components.

Illustrative examples described herein related aspects of this disclosure to aircraft and aerospace environments or applications. Aspects of this disclosure may be applied to other environments or applications. For example, aspects of this disclosure may be adapted so as to be applied to marine applications (e.g., boat, ship, submarine), terrestrial or vehicular applications (e.g., automotive applications), etc.

As described herein, in some embodiments various functions or acts may take place at a given location and/or in connection with the operation of one or more apparatuses, systems, or devices. For example, in some embodiments, a portion of a given function or act may be performed at a first device or location, and the remainder of the function or act may be performed at one or more additional devices or locations.

Embodiments may be implemented using one or more technologies. In some embodiments, an apparatus or system may include one or more processors, and memory storing instructions that, when executed by the one or more processors, cause the apparatus or system to perform one or more methodological acts as described herein. Various mechanical components known to those of skill in the art may be used in some embodiments.

Embodiments may be implemented as one or more apparatuses, systems, and/or methods. In some embodiments, instructions may be stored on one or more computer-readable media, such as a transitory and/or non-transitory computer-readable medium. The instructions, when executed, may cause an entity (e.g., an apparatus or system) to perform one or more methodological acts as described herein.

Aspects of the disclosure have been described in terms of illustrative embodiments thereof Numerous other embodiments, modifications and variations within the scope and spirit of the appended claims will occur to persons of ordinary skill in the art from a review of this disclosure. For example, one of ordinary skill in the art will appreciate that the steps described in conjunction with the illustrative figures may be performed in other than the recited order, and that one or more steps illustrated may be optional.

What is claimed is:

1. A method comprising:
   receiving, by a computing device comprising a processor, at least one control input associated with an aircraft;
   obtaining, by the computing device, a predicted response to the at least one control input by filtering on a trim position, wherein the predicted response is based on a model of the aircraft;
   obtaining, by the computing device, an actual response of the aircraft to the at least one control input;

comparing, by the computing device, the predicted response and the actual response by subtracting the predicted response from the actual response;

updating, by the computing device, the model using a correction factor determined in response to the subtracting the predicted response from the actual response; and determining, by the computing device, at least one attribute based on the comparison.

2. The method of claim 1, wherein the at least one control input comprises at least one of a swashplate position and a blade angle.

3. The method of claim 1, wherein the trim position corresponds to a value for the at least one control input that generates a zero-valued output for the subtraction.

4. The method of claim 1, wherein the at least one attribute comprises at least one of a weight, a center of gravity, and a distribution of mass.

5. The method of claim 1, further comprising:

causing, by the computing device, the at least one attribute to be presented on a display device.

6. The method of claim 1, wherein the at least one attribute is determined, substantially in real-time, when the aircraft is in flight.

7. An apparatus comprising:

at least one processor; and memory having instructions stored thereon that, when executed by the at least one processor, cause the apparatus to:

receive at least one control input associated with an aircraft, obtain a predicted response to the at least one control input by filtering on a trim position, wherein the predicted response is based on a model of the aircraft, obtain an actual response of the aircraft to the at least one control input, compare the predicted response and the actual response by subtracting the predicted response from the actual response, update the model using a correction factor determined in response to the subtracting the predicted response from the actual response, and determine at least one attribute based on the comparison.

8. An apparatus comprising:

at least one processor; and memory having instructions stored thereon that, when executed by the at least one processor, cause the apparatus to:

receive at least one control input associated with an aircraft, obtain a predicted response to the at least one control input by filtering on a trim position, wherein the predicted response is based on a model of the aircraft, obtain an actual response of the aircraft to the at least one control input, compare the predicted response and the actual response, and determine at least one attribute based on the comparison;

wherein comparing the predicted response and the actual response comprises subtracting the predicted response from the actual response;

wherein the instructions, when executed by the at least one processor, cause the apparatus to:

update the model using a correction factor based on a calculated difference of the subtraction in order to force the predicted response to converge to the actual response over time.

9. The apparatus of claim 7, wherein the trim position corresponds to a value for the at least one control input that generates a zero-valued output for the subtraction.

10. The apparatus of claim 7, wherein the at least one attribute comprises at least one of a weight, a center of gravity, and a distribution of mass.

11. The apparatus of claim 7, wherein the filtering on the trim position comprises subtracting the trim position from the at least one control input to generate an output difference and applying the model to the output difference.

12. The apparatus of claim 11, wherein the instructions, when executed by the at least one processor, cause the apparatus to:

integrate an output of the model applied to the output difference to generate the predicted response.

13. The apparatus of claim 7, wherein the at least one attribute is determined for one of a pitch axis, a roll axis, and a yaw axis associated with the aircraft.

14. An aircraft comprising:

an adaptive vehicle management system configured to:

receive at least one control input associated with the aircraft;

obtain a predicted response to the at least one control input by filtering on a trim position, wherein the predicted response is based on a model of the aircraft;

obtain an actual response of the aircraft to the at least one control input;

compare the predicted response and the actual response by subtracting the predicted response from the actual response, update the model using a correction factor determined in response to the subtracting the predicted response from the actual response; and determine at least one attribute based on the comparison.

15. An aircraft comprising:

an adaptive vehicle management system configured to:

receive at least one control input associated with the aircraft;

obtain a predicted response to the at least one control input by filtering on a trim position, wherein the predicted response is based on a model of the aircraft;

obtain an actual response of the aircraft to the at least one control input;

compare the predicted response and the actual response; and determine at least one attribute based on the comparison;

wherein a comparison of the predicted response and the actual response comprises a subtraction of the predicted response from the actual response, and wherein the adaptive vehicle management system is configured to:

generate a confidence score in association with the predicted response;

output the confidence score to a device; and update the model using a correction factor based on a calculated difference of the subtraction in order to force the predicted response to converge to the actual response over time.

16. The aircraft of claim 15, wherein the trim position corresponds to a value for the at least one control input that generates a zero-valued output for the subtraction.

17. The aircraft of claim 14, wherein the at least one attribute comprises at least one of a weight, a center of gravity, and a distribution of mass, and wherein the adaptive vehicle management system is configured to determine the at least one attribute in real-time for at least one of a pitch axis, a roll axis, and a yaw axis associated with the aircraft when the aircraft is in flight.

* * * * *